United States Patent
Hu et al.

(10) Patent No.: US 10,438,380 B2
(45) Date of Patent: Oct. 8, 2019

(54) SYSTEMS AND METHODS FOR TRANSLATION OF MEDICAL IMAGING USING MACHINE LEARNING

(71) Applicants: KONINKLIJKE PHILIPS N.V., Eindhoven (NL); CASE WESTERN RESERVE UNIVERSITY, Cleveland, OH (US); UNIVERSITY HOSPITALS MEDICAL GROUP, INC., Cleveland, OH (US)

(72) Inventors: Lingzhi Hu, Cleveland, OH (US); Lingxiong Shao, Saratoga, CA (US); Raymond Frank Muzic, Mentor, OH (US); Kuan-Hao Su, Cleveland, OH (US); Pengjiang Qian, Cleveland, OH (US)

(73) Assignees: KONINKLIJKE PHILIPS N.V., Eindhoven (NL); CASE WESTERN RESERVE UNIVERSITY, Cleveland, OH (US); UNIVERSITY HOSPITALS MEDICAL GROUP, INC., Cleveland, OH (US)

(*) Notice: Subject to any disclaimer, the term of this patent is extended or adjusted under 35 U.S.C. 154(b) by 122 days.

(21) Appl. No.: 15/533,457

(22) PCT Filed: Nov. 20, 2015

(86) PCT No.: PCT/IB2015/058995
§ 371 (c)(1),
(2) Date: Jun. 6, 2017

(87) PCT Pub. No.: WO2016/092394
PCT Pub. Date: Jun. 16, 2016

(65) Prior Publication Data
US 2017/0372497 A1    Dec. 28, 2017

Related U.S. Application Data

(60) Provisional application No. 62/090,051, filed on Dec. 10, 2014.

(51) Int. Cl.
*A61B 1/00* (2006.01)
*G06T 11/00* (2006.01)
(Continued)

(52) U.S. Cl.
CPC ............ *G06T 11/006* (2013.01); *G06T 5/007* (2013.01); *G06T 2207/10081* (2013.01);
(Continued)

(58) Field of Classification Search
CPC ................. G06T 5/00; G06T 7/00; A61B 5/00
(Continued)

(56) References Cited

U.S. PATENT DOCUMENTS

| | | | |
|---|---|---|---|
| 5,793,888 A * | 8/1998 | Delanoy | G06K 9/6253 382/219 |
| 2005/0144149 A1 | 6/2005 | Li | |

(Continued)

OTHER PUBLICATIONS

Johansson, et al., "CT substitute derived from MRI sequences with ultrashort echo time", Medical Physics, vol. 38, No. 5, May 2011.
(Continued)

*Primary Examiner* — Abolfazl Tabatabai

(57) ABSTRACT

A medical image (24) with contrast of one imaging modality is emulated from images with other contrast characteristics. A plurality of input images (20) of a region of interest with the other contrast characteristics is received. A transform (22) which was generated by machine learning is applied to the corresponding plurality of input images (20) to generate a scalar value (38) or a vector value (38') representing the corresponding voxel (36') of the medical image (24) to be evaluated.

20 Claims, 10 Drawing Sheets

(51) Int. Cl.
*G06T 5/00* (2006.01)
*A61B 5/00* (2006.01)

(52) U.S. Cl.
CPC ............... *G06T 2207/10088* (2013.01); *G06T 2207/10104* (2013.01); *G06T 2207/20081* (2013.01); *G06T 2207/20221* (2013.01)

(58) Field of Classification Search
USPC ........................................................ 382/131
See application file for complete search history.

(56) References Cited

U.S. PATENT DOCUMENTS

2008/0085044 A1     4/2008   Zhou
2013/0304710 A1*   11/2013   Nachev ................ G06K 9/6284
                                                                                                         707/690

OTHER PUBLICATIONS

Bharath, et al., "Magnetic Resonance-Based Attenuation Correction for PET/MR Hybrid Imaging Using Continuous Valued Attenuation Maps", Investigative Radiology, vol. 48, No. 5, May 2013.

Shu-Hui, et al., "Investigation of a method for generating synthetic CT models from MRI scans of the head and neck for radiation therapy", Physics in Medicine and Biology, vol. 58, No. 23, Nov. 2013.

Johansson, et al., "Voxel-wise uncertainty in CT substitute derived from MRI", vol. 39, No. 6, Jun. 2012.

Suzuki, et al., "Pixel-Based Machine Learning in Medical Imaging", International Journal of Biomedical Imaging vol. 2012, Article ID 792079, 18 pages.

Hinrichs, "Multi-Modality Inference Methods for Neuroimaging with Applications to Alzheimer's Disease Research", 2012.

* cited by examiner

SYSTEMS AND METHODS FOR TRANSLATION OF MEDICAL IMAGING USING MACHINE LEARNING

CROSS REFERENCE TO RELATED APPLICATIONS

This application is the U.S. National Phase application under 35 U.S.C. § 371 of International Application No. PCT/IB2015/058995, filed Nov. 20, 2015, published as WO 2016/092394 on Jun. 16, 2016, which claims the benefit of U.S. Provisional Patent Application No. 62/090,051 filed Dec. 10, 2014. These applications are hereby incorporated by reference herein.

FIELD

The present application relates generally to systems and methods for generating a medical image of a subject. It finds particular application in conjunction with systems and methods for translating medical images from one image modality into a second image modality that is different from the first image modality and will be described with particular reference thereto. However, it is to be understood that it also finds application in other usage scenarios and is not necessarily limited to the aforementioned application.

BACKGROUND

In hybrid-imaging systems, two different imaging modalities are used to locate or measure different constituents in a common object space. In one example, two imaging scanners, such as a computed tomography (CT) scanner and a magnetic resonance (MR) scanner, can be used to create images of internal structures (e.g., bones, the spine, etc.) and soft tissue structures (e.g., the brain, vasculature, joints, etc.) within the body. In another example, nuclear scanners, such as positron emission tomography (PET) or single-photon emission computed tomography (SPECT), are coupled with an imaging scanner and can be used to create functional images indicative of metabolic activity and biochemical processes within tissues of the body.

Sometimes, an image from only one modality is available. It may be advantageous to translate the image of the one image modality to emulate an image of another modality. For example, it can be advantageous to translate an MR anatomical image into a CT attenuation image to compare it with an earlier CT image. In another example, MR images can be converted into CT-like attenuation images for attenuation correction in a PET image reconstruction. Another clinical example is generating an image (e.g., a pseudo Fluorodeoxyglucose (FDG)/PET image, a diffusion-weighted whole-body image with background body signal suppression (DWIBS), and the like) from one or more MR images, which could potentially reduce a subject's exposure to radiation without compromising diagnostic confidence. In the domain of computer-aided diagnosis, multi-parametric images can be translated into an underlying pathology of a lesion that could be used to help subject management.

Even though there is an urgent need to establish a correlation across different medical imaging modalities, it is challenging to use conventional or analytic approaches to realize such translation for one or more reasons. First, medical images are prone to noise, which can vary depending on a particular anatomy of a subject and imaging physics. Second, there is typically no 1-to-1 conversion relation among different imaging contrast and modalities. For example, air and bone both have an MR signal that is very close to that of background noise, whereas in CT imaging, air has a near zero attenuation and bone has a very high attenuation. Third, a translation processor that applies to one case of such conversion might not be applicable to a different application owing to different imaging physics of different imaging modalities. Present techniques are subject to ambiguities and errors.

The present application provides new and improved systems and methods which overcome the above-referenced problems and others.

The present disclosure addresses these limitations by providing a generally applicable solution to image contrast conversion based on a machine learning approach. For example, the present disclosure provides systems and methods with a transform processor to resolve the degeneration of imaging contrast translation (i.e., non 1-to-1 mapping) by offering a vector-to-scalar mapping process or a vector-to-vector mapping process. The present disclosure also provides systems and methods with a transform processor that uses input images, exiting images, and/or other basic subject information to train itself and establish a database as prior knowledge. In addition, the present disclosure also uses systems and methods with a machine-learning processor to predict a vector-to-scalar conversion relationship for a target image and/or data generation.

SUMMARY

In accordance with one aspect, a method for generating a medical image is provided. The method includes receiving a plurality of input images of a region of interest. Each input image has different characteristics. A transform is applied to the plurality of input images. A target image is generated from the plurality of input images. The target image characteristics are different from the input image characteristics.

One advantage resides in more accurate image translations.

Another advantage resides in prompt, automated translations.

Another advantage resides in resolving degeneration of an imaging contrast translation.

Another advantage resides in using machine-learning to optimize and refine an inter-modality translation algorithm.

Still further advantages of the present invention will be appreciated to those of ordinary skill in the art upon reading and understand the following detailed description.

BRIEF DESCRIPTION OF DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

The present application is directed to systems and methods for generating and using a medical image of one or more target tissues. As used herein, the term "target tissue" refers to any desired tissue (e.g., the brain, the heart, the lungs, the kidneys, the liver, the pancreas, one or more bones, etc.) of which a medical image is desired. As discussed in more detail below, the systems and methods of the present disclosure provide an image contrast translation based on a machine-learning approach. Advantageously, the systems and methods of the present disclosure provide a processor that: (1) resolves the degeneration of imaging contrast translation (non 1-to-1 mapping) by offering a vector-to-scalar mapping process or a vector-to-vector mapping process; (2) uses exiting images and other basic subject information to train the processor and establish a big data database as prior knowledge; and (3) predicts the vector-to-scalar conversion relation for target image/data generation. As used herein, the term "subject" and variants thereof refer to an organism (e.g., a patient, a laboratory animal, and the like), of which an image is taken.

Figure 1:
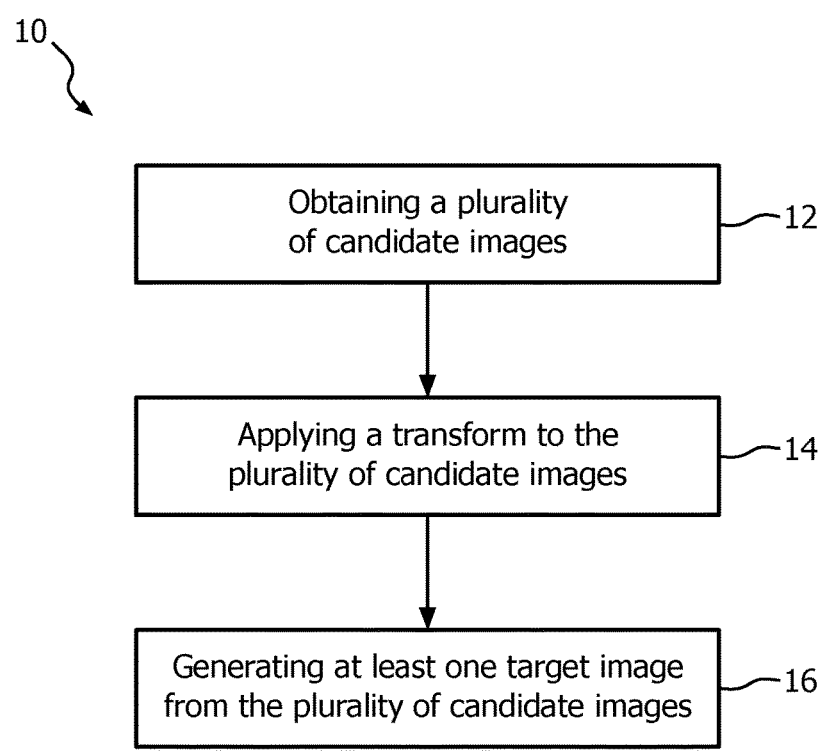
FIG. 1 is an exemplary flowchart illustrating the contrast translation input images into a target image in accordance with one aspect of the present disclosure.
Figure 2:
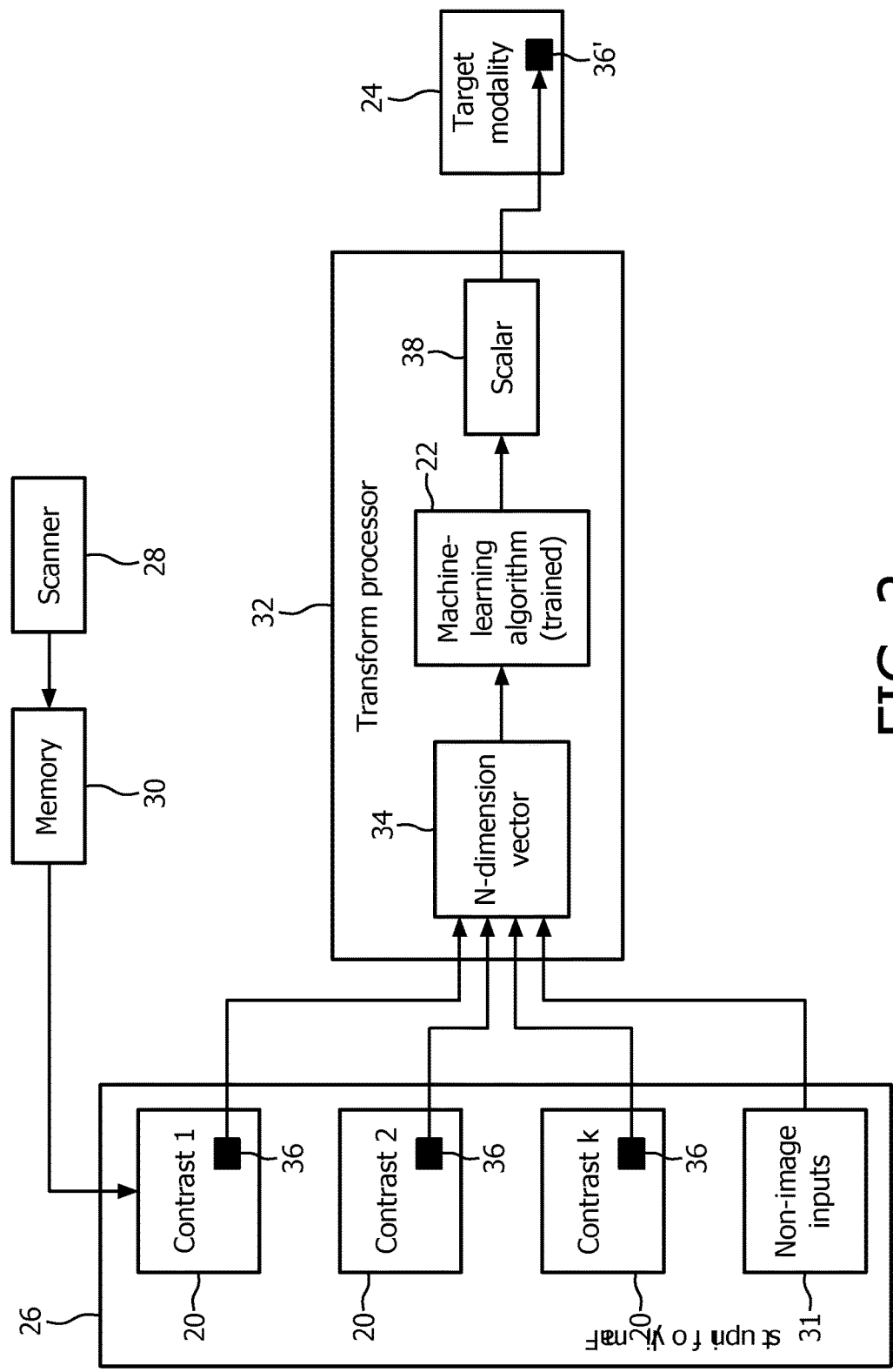
FIG. 2 is a schematic illustration of an apparatus configured to perform the method of FIG. 1.

With reference to FIGS. 1 and 2, a method 10 is provided for generating one or more medical images. The method 10 includes the steps of: obtaining a plurality of input images 20 of a target in which each images has different characteristics (Step 12); applying a trained or untrained machine learning algorithm transform 22 to the plurality of input images (Step 14); and generating at least one target output image 24 from the plurality of input images (Step 16).

At Step 12, a plurality of input images 20 of a target region of a candidate subject is obtained. The plurality of input images 20 is included in a family of inputs 26. In some examples, the family of inputs 26 includes k input images, where k is a plural integer (e.g., k=10). The plurality of images 20, in one embodiment, are all obtained using one type of diagnostic imaging scanner 28 operated in different ways to generate images with differing characteristics. In another embodiment, the input images 20 are obtained from two or more types of scanners. For example, the scanners 28 are selected from a group of known medical imaging systems that includes MR, CT, ultrasound, X-ray, radiography, nuclear medicine (e.g., PET, SPECT, and the like), elastography, tactile imaging, photoacoustic imaging, thermography, echocardiography, functional near-infrared spectroscopy, and the like).

Each input image 20 in the family of inputs 26 has different characteristics. In some embodiments, when the scanner 28 is an MR scanner, the family of inputs 26 includes images having different parameters (e.g., parameters of a multi-parametric image). For example, the input images 20 can include an Ultrashort Echo Time image, a Dixon fat image, a Dixon water image, a proton density MR image, a spectroscopic MR image, Dynamic Contrast Enhanced MR, a Diffusion Weighted MR image, and the like. Each of the input images has different contrast characteristics. In another example, the family of inputs 26 can include images (e.g. images with spatial and textural similarities) derived from the inputs image 20. The images can be stored in a memory 30, such as a subject database, or as part of a subject's medical record.

In some examples, the family of inputs 26 includes one or more non-image inputs 31 of a subject to bring the total inputs to n, where n is a plural integer. The subject information non-image inputs 31 include information related to the imaged subject. For example, the non-image inputs 31 can include name, medical indication, gender, body mass index, relevant blood markers, height, weight, age, body fat percentage, disease existence, the quality of life, various historical medical measurements such as lab test results, systolic/diastolic blood pressure, pulse rate, respiratory rate, diagnoses, past medical interventions, implants, photographs, videos, genetic information, family history and the like of the subject. In another example, the non-image medical inputs 31 can include values derived from the input images 20. The medical inputs 31 can be obtained from the subject database memory 30.

Figure 3:
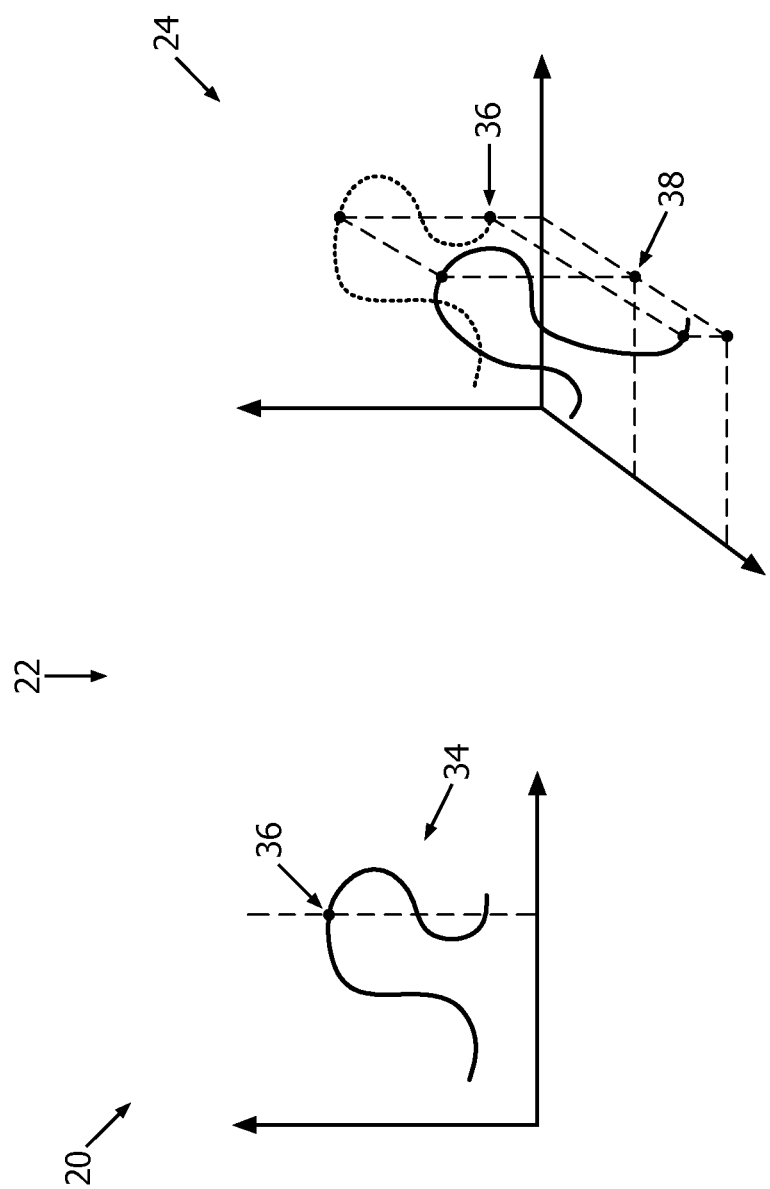
FIGS. 3A-3B are diagrammatic illustrations of transform characteristics.

At Step 14, a transform processor 32 applies the transform 22 to the plurality of input images 20. With reference to FIGS. 3A-3B, the input images 20 can be generated by the same scanner 28 in a single imaging session. In some instances, the input images 20 include MR images. For example, the input images 20 include an Ultrashort Echo Time image, a Dixon fat image, a Dixon water image, a regular MR image, a spectroscopic MR image, Dynamic Contrast Enhanced MR, a Diffusion Weighted MR image, and the like. The voxels of these images 20 convey different information. The transform processor 32 includes a vector mapping processor (e.g., a vector-to-scalar mapping processor, a vector-to-vector mapping processor, and the like), computer routine, or the like 34 which collects the k input images 20 and looks at the corresponding voxel 36 in each input image 20. In one example, with a vector-to-scalar mapping processor 34, the values of each corresponding voxel, the k input images 20, and the subject information inputs 32 form an "n×1" vector. The transform processor 32 operates on each "n×1" vector with transform 22 to generate a scalar value 38 representing a corresponding voxel 36' of the target output image. In another example, with a vector-to-vector mapping processor 34, the values of each corresponding voxel, the k input images 20, and the subject information inputs 32 form an "n×m" vector. The transform processor 32 operates on each "n×m" vector with transform 22 to generate a vector value 38' representing a corresponding voxel 36' of the target output image.

As described in greater detail below, the transform 22 is generated using a machine learning technique. The vectors can be transformed by a trained machine training algorithm. In one embodiment, the clinician changes, e.g., corrects, the target image and the changes are used to refine the training of the machine learning algorithm. In another embodiment, each vector is input into a pre-calculated lookup table generated by a trained machine learning algorithm.

Figure 4:
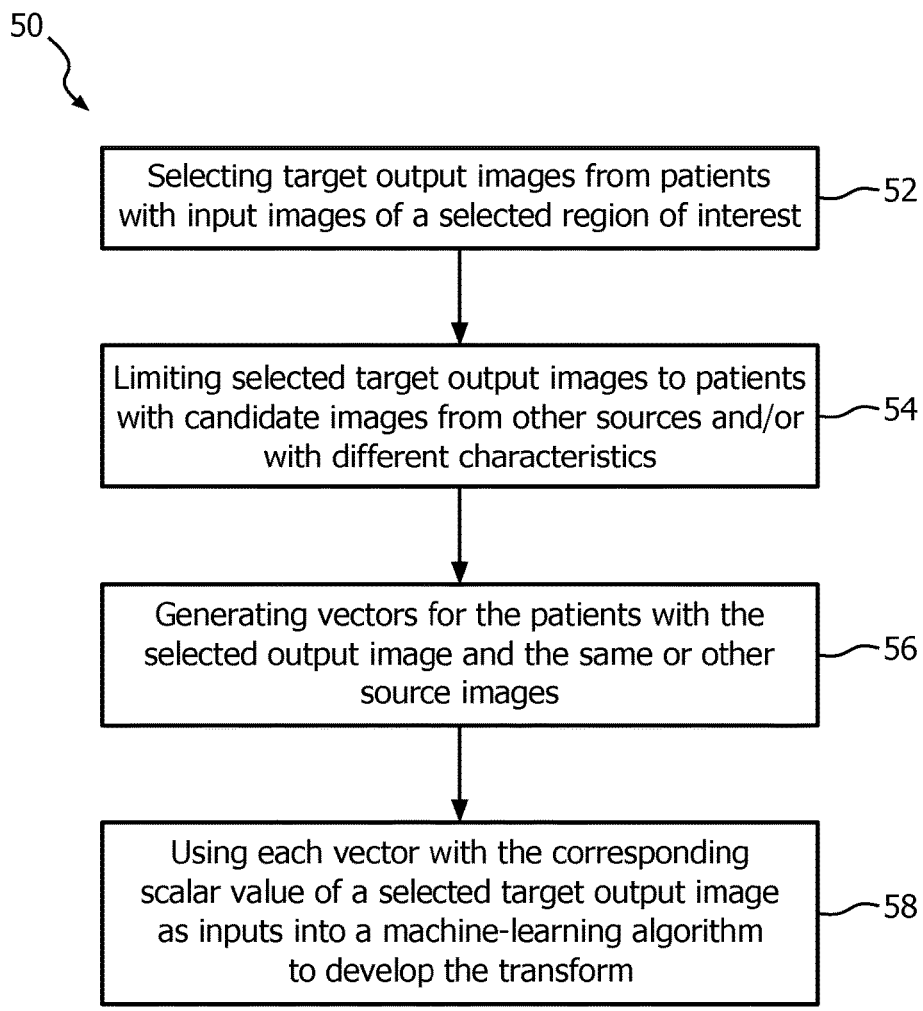
FIG. 4 is an exemplary flowchart illustrating training of a transform processor in accordance with another aspect of the present disclosure.
Figure 5:
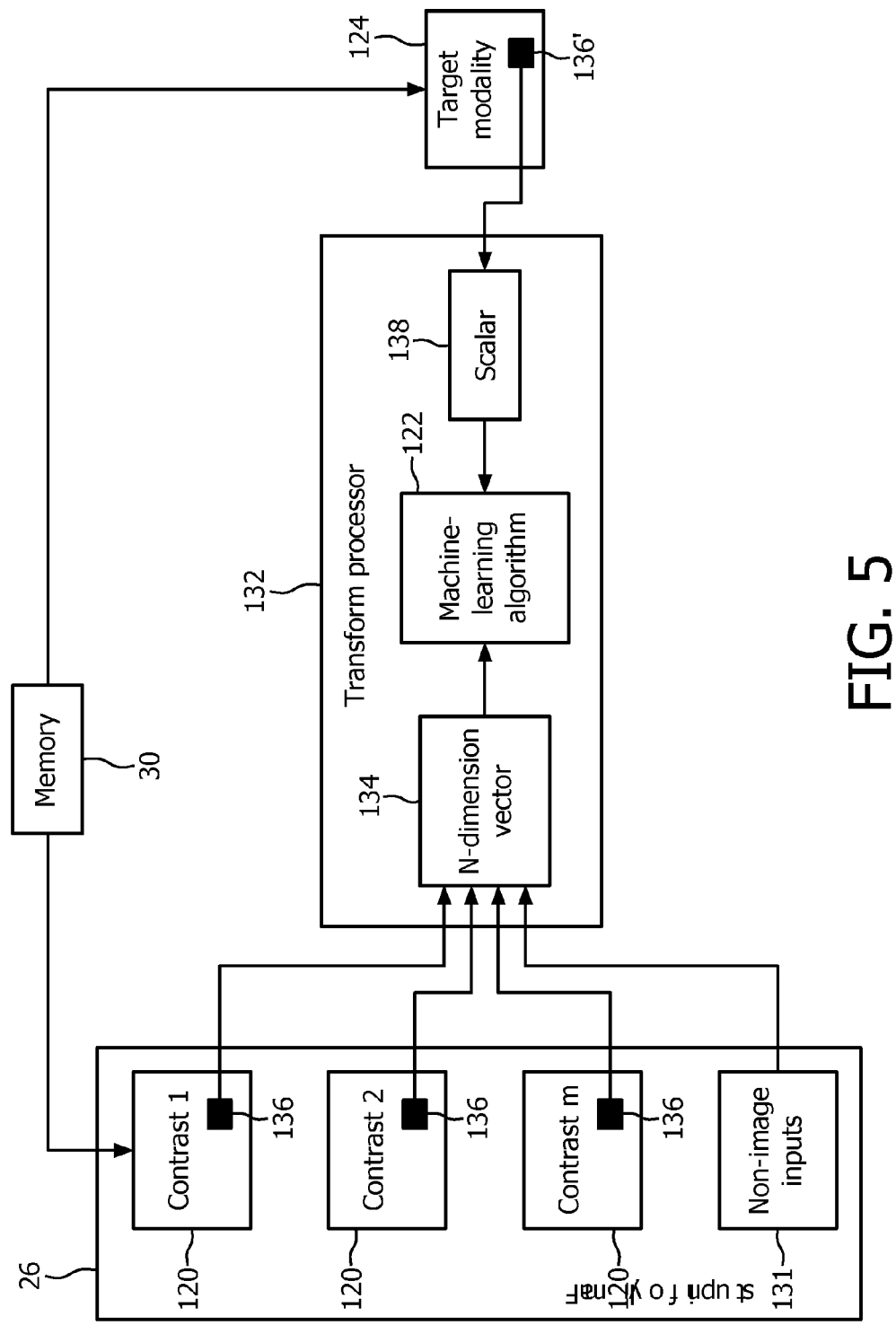
FIG. 5 is a schematic illustration of a system for training the transform of FIG. 4.

With reference to FIGS. 4 and 5, the transform 22 is generated using data mining and machine-learning according to a method 50. A large subject records database (e.g., the subject storage information system 30) contains images of many subjects, such as a hospital system-wise database with images dating back for years, a repository of images from a national collection, a collection of images from an insurance company, and the like. At Step 52, subjects with a target output image 124 of a target region of interest (ROI) (e.g., having pixels or voxels) to be emulated are selected, such as CT attenuation images. The selected subjects are further limited to subjects who also have other candidate images 120 from other sources and/or with different characteristics, such as MR UTE, Dixon fat, Dixon water, etc. images (Step 54). For each subject, the corresponding voxels 136 of the other candidate images 120 are formed into the vectors 134. The vectors 134 of each corresponding voxel 136 for each of a plurality of subjects are generated (Step 56). The vectors 134 are created such that all of the vector elements represent the same characteristic. For example, the first element of each vector 134 can be the MR UTE value of the corresponding voxel, the second element can be the Dixon fat value, the third element can be the Dixon water value, and so on. Because all selected subjects may not have all of the same other source images 120, some vector elements of some subjects may be undefined. Each vector 134 with the corresponding scalar or vector value 138 of a selected target output image 124 to be emulated are used as inputs (Step 56) into the machine-learning algorithm 122 which, iteratively over many subjects, or non-iteratively, develops the transform. The machine-learning algorithm 122 can include any known machine-learning algorithm (e.g., supervised learning, unsupervised learning, semi-supervised learning, transduction, reinforcement learning, learning to learn, developmental learning, and the like.). In one embodiment, an iterative process (e.g., trial and error) determines which vector elements (i.e., the corresponding other source), that do not contribute to the unique transform and eliminates those inputs 126. Various learning techniques are contemplated such as support vector machines, neural networks, inductive logic programming, clustering, association rule learning, Bayesian networks, reinforcement learning, representation learning, similarity learning, sparse dictionary learning, and the like. The process is repeated for other ROIs, other target output images 124 to be emulated, and the like. In another embodiment, one or more of the secondary inputs 131 are added as vector elements.

In another example, only a limited group of other source images 120 are used. For example, if an MR to CT image transform 32 is to be developed, the vector elements and other source images are limited to MR inputs. The above process 50 then determines which set(s) of MR candidate images 120 define a unique and unambiguous transform into CT values. An MR image protocol to take the set(s) of MR images in an imaging session is defined.

In another embodiment, some sets of candidate images 120 produce correct results most of the time, but have one or more ambiguities at some extremes of values. A confidence value for each set is calculated to indicate a percentage of the time the set produces a unique and unambiguous output image 124.

Of course, the processor 32 which transforms input images 20 of a subject into the emulated output image 36 and the processor 132 which generates the transform by data mining prior images of many subjects can be implemented in separate, unrelated systems.

Figure 6:
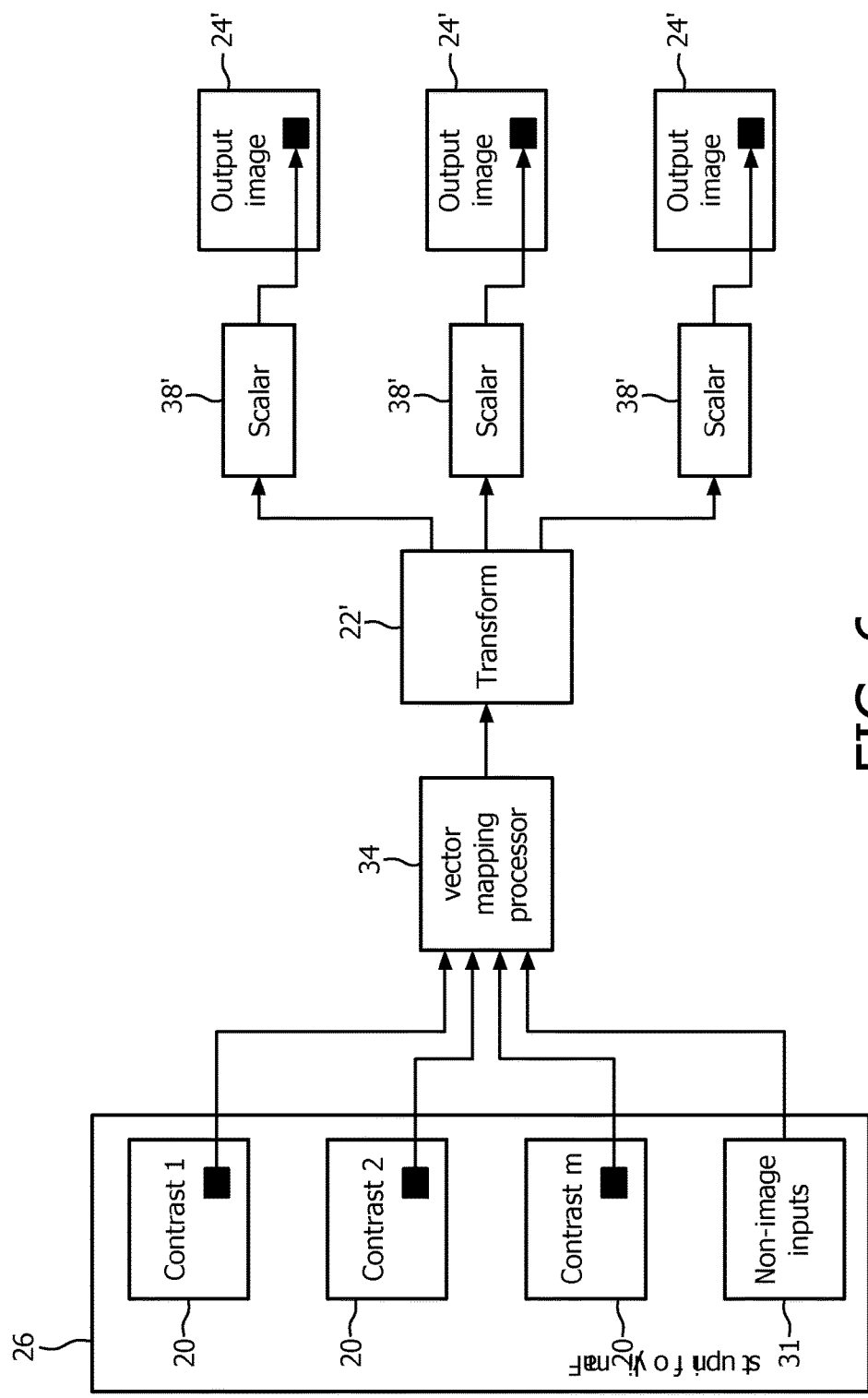
FIG. 6 is a diagrammatic illustration of a system for generating a plurality of target images from a series of input images.

At Step 18, the output target image 24 is transformed from the input images 20. In the embodiment of FIG. 6, a family of output images 24' is generated from the family of input images 20. The family of input images includes the input candidate images 20 and the family of output images 24' includes one or more target output images 24'. The images 24' include the target images 20 that are selected from the second image modality group including MR, CT, ultrasound, X-ray, radiography, nuclear medicine, elastography, tactile imaging, photoacoustic imaging, thermography, echocardiography, and functional near-infrared spectroscopy. It will be appreciated that other medical output target images can be generated, a transform 22', or a plurality of transforms, transform each vector 34 into a plurality of scalars 38' each representing the corresponding voxel in one of the output imagers 24'.

Figure 7:
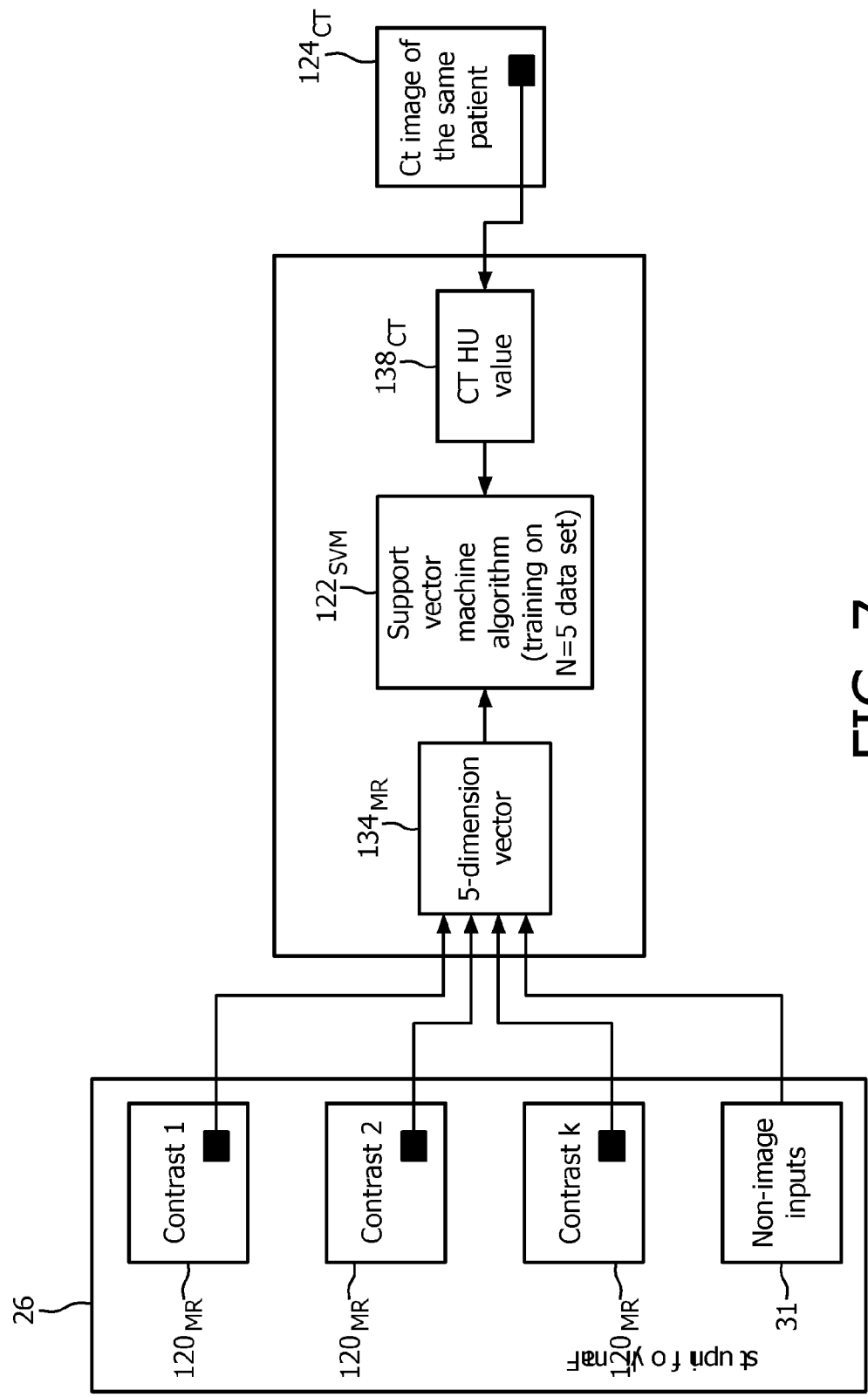
FIG. 7 is a diagrammatic illustration of a system for training a support vector machine algorithm to convert a plurality of magnetic resonance images into a CT image.
Figure 8:
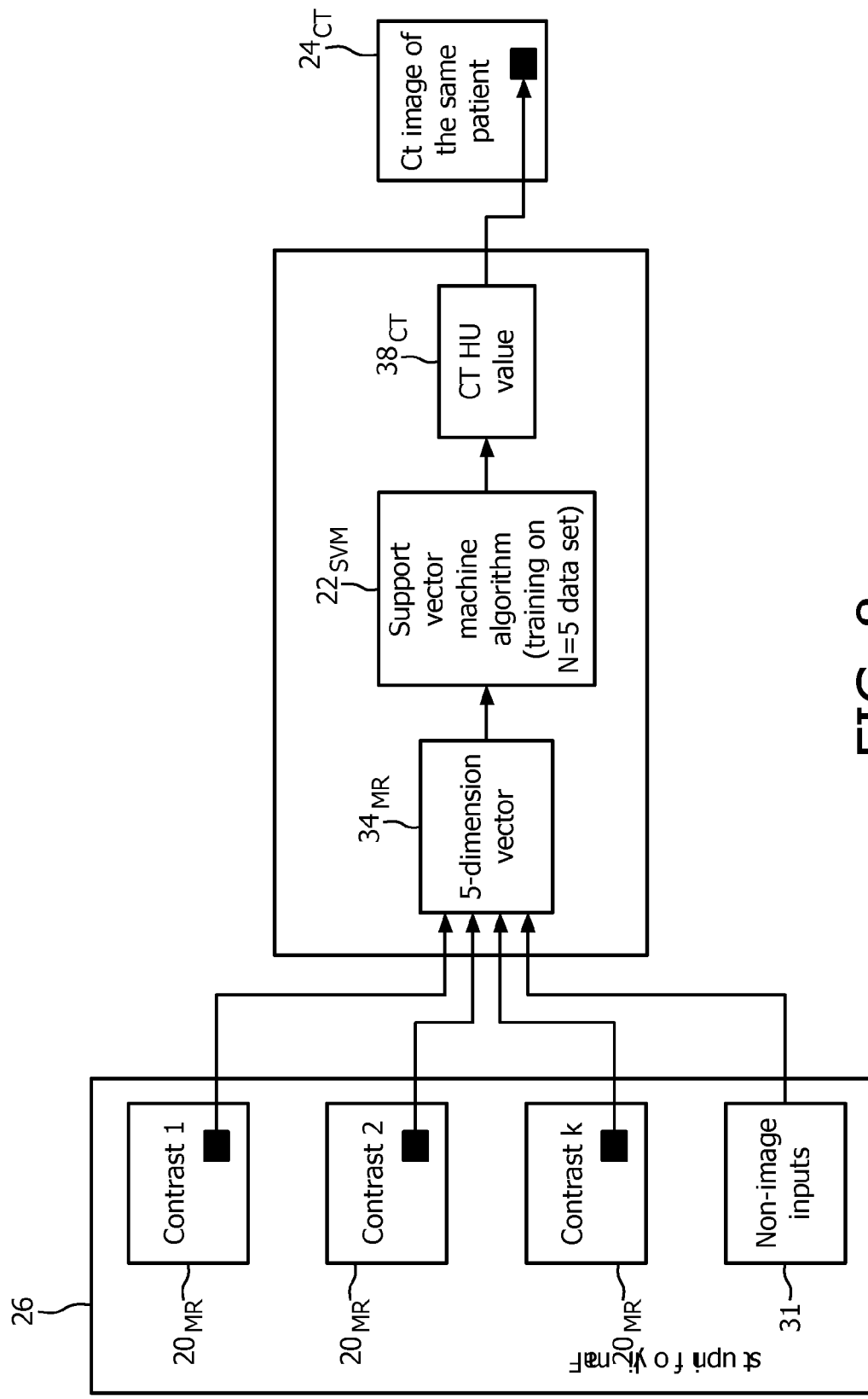
FIG. 8 is a diagrammatic illustration of a system for converting five MR images of a region of interest into an emulated CT image using the algorithm trained by the system of FIG. 6.

FIGS. 7 and 8 represent a specific application of this technique, particularly the transformation of MR images into a CT attenuation image. Referring first to FIG. 7, a subject records database is search for a subject who has a CT image of the region of interest, particularly the head, and MR images, particularly a T1 image, a UTE, a Dixon fat image, a Dixon water image, and a T2- (or T2*-)weighted image. For the corresponding voxel of the five MR images $20_{MR}$ and the Hounsfield value for the corresponding voxel of the CT image $24_{CT}$ are identified. As shown, the corresponding voxels of the MR images are formed into a 5×1 vector $34_{MR}$. It will be appreciated that there may be more or less than 5 inputs that can include values from neighboring pixels in each row. The readout CT Hounsfield value represents a corresponding scalar $38_{CT}$. The 5×1 vector and the Hounsfield value are used as input data set to train a support vector machine algorithm $22_{SVM}$. The corresponding vector and Hounsfield value scalar for each of the corresponding voxels of the image are likewise used as a training data set. Preferably, the training process is repeated with corresponding MR and CT images of a plurality of subjects. Ideally, the training process is repeated until the support vector machine stabilizes, which may be after hundreds or more input data sets.

With reference to FIG. 8, once the support vector machine algorithm 22 has been trained, a new subject is imaged in a magnetic resonance scanner. More specifically to the present example, the subject is imaged with an imaging protocol which includes generating a T1-weighted image, a UTE image, a Dixon fat image, a Dixon water image, and a T2- (or T2*-)weighted image. The corresponding voxels of each image are formed into a five dimensional vector $34_{MR}$ which are input into a trained support vector machine $22_{SVM}$. It will be appreciated that there may be more or less than 5 inputs that can include values from neighboring pixels in each row. The support vector machine $22_{SVM}$, based on its prior training, predicts a scalar Hounsfield value $38_{CT}$ for the corresponding voxel of a CT image $24_{CT}$ to be emulated or synthesized. Similarly, vectors $34_{MR}$ are formed for all of the corresponding voxels of the input MR images $20_{MR}$. The support vector machine $22_{SVM}$ generates the corresponding Hounsfield values for each voxel which are assembled into the output CT image $24_{CT}$.

Figure 9:
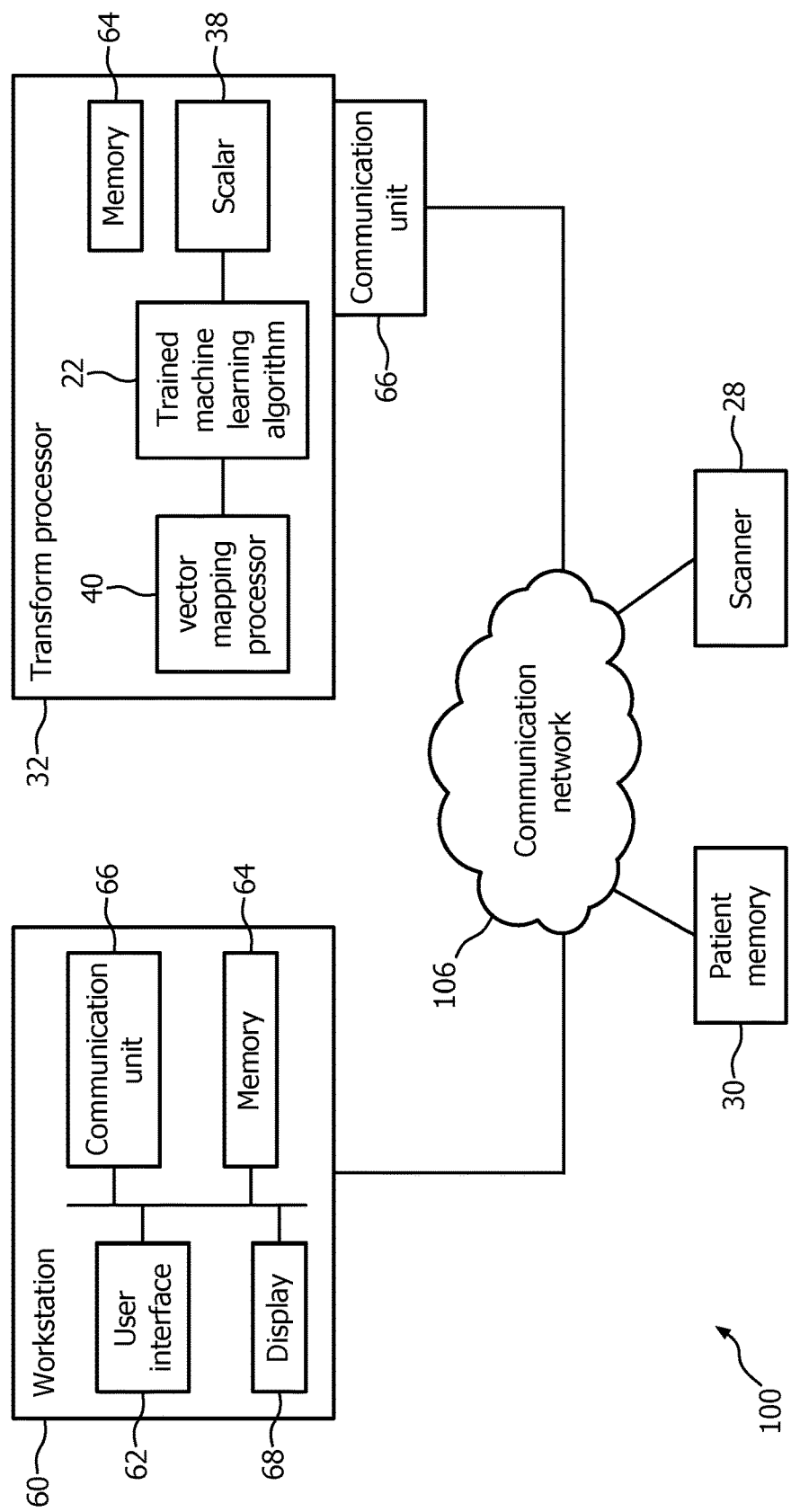
FIG. 9 is a diagrammatic illustration of a system which uses a trained machine learning algorithm to predict a target image.

With reference to FIG. 9, the image generation system 100 includes a workstation 60 with a user interface 62 by which an operator inputs commands to cause a set of input images to be retrieved from the subject memory 30 or directly from one or more scanners 28. The retrieved input images are transferred to the transform processor 32 where they are temporarily stored in a memory 64. The vector processor 34 forms vectors from the corresponding pixels of each of the input images and the trained machine learning algorithm 22 predicts a scalar voxel value for the corresponding value 38 for the corresponding pixel of the output image. A communication module 66 communicates each voxel value to the memory 64 in which the output image is assembled via a wireless network 106 (e.g., Internet, Intranet, a wireless network, and the like). The memory can be in the workstation 60, the transform processor 32, or the subject information memory 30. The workstation 60 includes a display 68 on which the output image is displayed. Optionally, the input images and other subject information are also displayed. The operator can use the user input 62 to configure the output image, the input image, other medical information, a diagnosis, recommended treatment, and the like into a medical report for storage in the subject information system 30.

Figure 10:
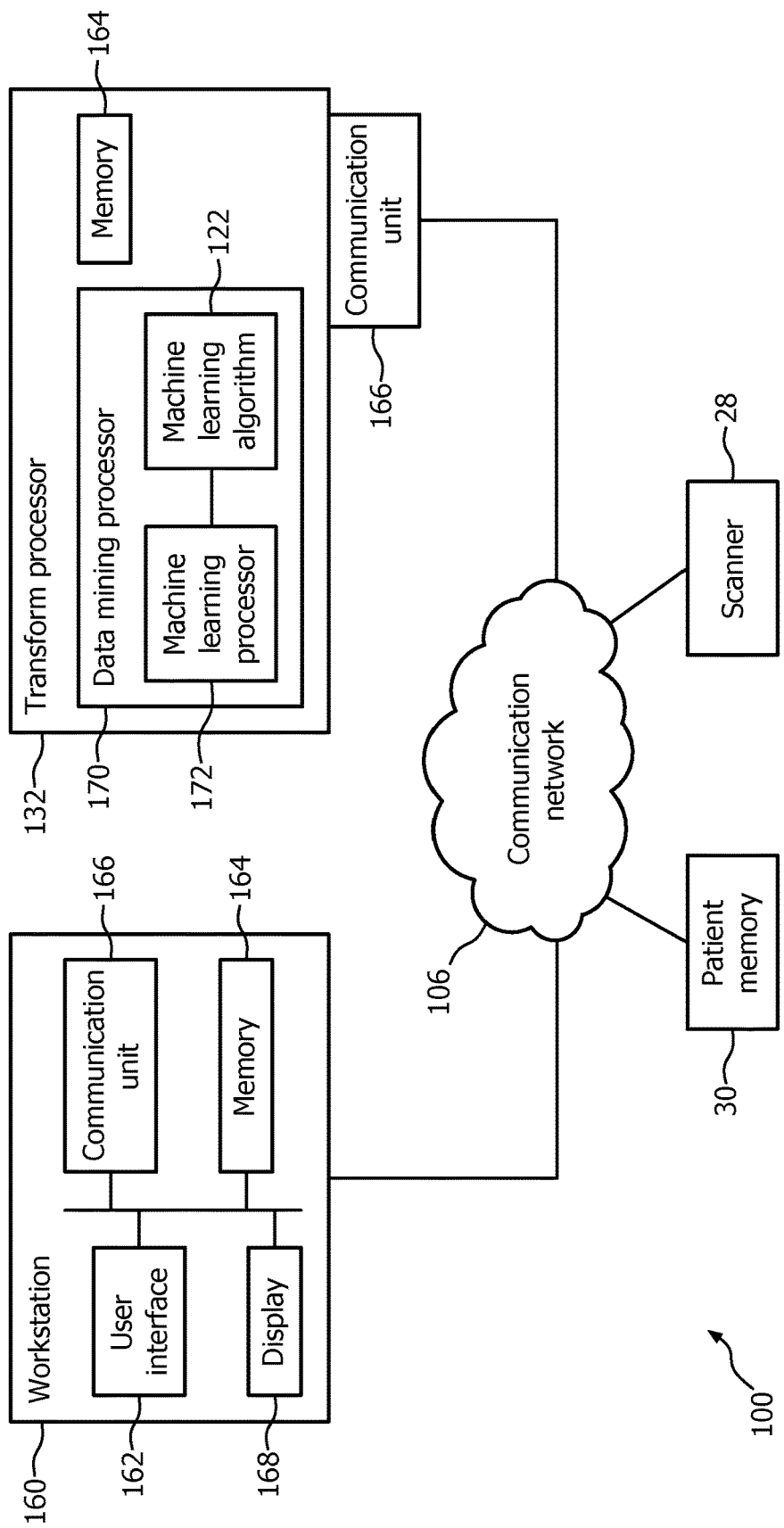
FIG. 10 is a distributed system for training the machine learning algorithm of FIG. 9.

With reference to FIG. 10, the image generation system 100 includes a workstation 160 is used to control the process for teaching the machine learning algorithm 122. The workstation has a user interface 162 in which the user inputs instructions to a transform processor 132, particularly a data mining process or routine 170 which searches or data mines the subject information memory 30 for subjects who have images of a region of interest taken with different imaging modalities. In one example, the data mining processor 170 can locate the functionalities of the input images 20 and/or the non-image inputs 31, including feature extraction and derivation (e.g., spatial information, textures, and the like). A machine learning processor 172 forms the vectors from the corresponding pixels of the retrieved images and the scalar from the corresponding voxel of the retrieved target image. The vectors and corresponding scalars are used to train the machine learning algorithm 122. The training process is repeated for a plurality of voxels of a plurality of image sets of a plurality of subjects until the machine learning algorithm 122 is trained. The workstation 160 includes a memory 164 and a communication unit 166 for communicating with the communication network 106. The workstation 160 also includes a display 168 on which input and target images are displayed. In some embodiments, the operator provides inputs which guide the teaching of the machine learning algorithm 122 such that it stabilizes more quickly. In order to keep the process anonymous and to comply with HIPAA laws, the identification of specific subjects is neither retrieved from the memory 30 nor displayed on the display 168.

The image generation system 100 can include components known in the art of image generation systems. In one example, the display, the transform processor, and the subject storage information system each include a memory. As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips. As used herein, the communication network includes an Internet/Intranet server from which the stored instructions may be retrieved via the Internet/Intranet or a local area network; or so forth. Further, as used herein, the transform processor includes one or more of a microprocessor, a microcontroller, a graphic processing unit (GPU), an application-specific integrated circuit (ASIC), a field-programmable gate array (FPGA), and the like. In a further example, the user input device includes one or more of a mouse, a keyboard, a touch screen display, one or more buttons, one or more switches, one or more toggles, and the like. In another example, the databases include one or more memories. For example, the subject information system is a radiology information system (RIS) and/or picture archiving and communication system (PACS) which stores the candidate images. In a further example, the display includes one or more of a LCD display, an LED display, a plasma display, a projection display, a touch screen display, and the like, including 3D-capable versions of these. In a further example, the display, the transform processor, and the subject storage information system 30 each include a communication unit and/or at least one system bus. The communication unit provides a corresponding processor with an interface to at least one communication network, such as the wireless network 106. The system bus allows the exchange of data between sub-components of the components. Subcomponents include processors, memories, sensors, display devices, communication units, and so on.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method for generating at least one medical image, the method comprising:
   receiving a plurality of input medical images of a region of interest obtained using a first imaging modality, each input medical image with different characteristics;
   applying a transform to the plurality of input medical images; and
   generating at least one target medical image from the plurality of input medical images, the target medical image characteristics having image contrast of a second imaging modality different from the first imaging modality.

2. The method according to claim 1, wherein applying the transform to the plurality of input medical images includes:
   a) identifying a corresponding voxel in each of the input medical images and the target image;
   b) forming the identified voxels of the input medical images into a vector;
   c) transforming the vector into a scalar value or a vector value of the corresponding voxel of the target medical image; and
   d) repeating steps a)-c) for a plurality of voxels.

3. The method according to claim 1, wherein:
   receiving the plurality of input medical images includes receiving a plurality of magnetic resonance (MR) images with different contrast characteristics; and
   the generated target medical image includes a computed tomography (CT) attenuation image.

4. The method according to claim 1, wherein the plurality of input medical images includes:
   a T1-weighted image, an UltraShort Echo Time image, a Dixon fat image, and a Dixon water image.

5. The method according to claim 1, further including:
   providing non-image medical inputs to the transform, the non-image medical inputs being selected from the group including name, photographs, movies, genetic information, family history, medical indication, gender, body mass index, relevant blood markers, height, weight, age, body fat percentage, disease existence, the quality of life, various historical medical measurements such as lab test results, systolic/diastolic blood pressure, pulse rate, respiratory rate, diagnoses, past medical interventions, and implants.

6. The method according to claim 1, further including:
   calculating a confidence value of the generated target medical image.

7. The method according to claim 1, wherein the transform is generated with a machine-learning processor.

8. The method according to claim 1, further including:
receiving a family of medical inputs including the plurality of input medical images; and
generating a family of target medical images from the family of inputs;
wherein the family of medical inputs and the family of target medical images include medical images selected from the group including MR, ultrasound, X-ray, radiography, nuclear medicine, elastography, tactile imaging, photoacoustic imaging, thermography, echocardiography, functional near-infrared spectroscopy, and CT.

9. The method according to claim 1, further including:
training the transform with a plurality of candidate medical images and corresponding target medical images retrieved from a subject information storage database.

10. The method according to claim 1, further including:
training the transform by data mining a subject information database with a data mining processor to search and identify selected medical images and using an artificial intelligence processor to train the transform from the selected medical images using artificial intelligence.

11. A non-transitory computer readable medium carrying software to control a processor and perform the method according to claim 1.

12. An image generation system, comprising:
a transform processor programmed to:
receive a plurality of input medical images of a region of interest, each input medical image with different characteristics indicative of a first imaging modality;
apply a transform to the plurality of input medical images; and
generate at least one target medical image from the plurality of input medical images, the at least one target medical image having characteristics different from the input medical image characteristics;
a display configured to display at least the generated target medical image; and
a memory configured to storing the generated target medical image.

13. The image generation system according to claim 12, wherein the transform processor is further programmed to generate a family of target medical images from the plurality of input medical images; and
wherein the plurality of input medical images and the target medical images are selected from a group including MR, CT, ultrasound, X-ray, radiography, nuclear medicine, elastography, tactile imaging, photoacoustic imaging, thermography, echocardiography, and functional near-infrared spectroscopy.

14. The image generation system according to claim 12, wherein the transform processor further includes a vector processor which converts corresponding voxels of the input medical images to a vector and the transform includes a trained machine learning processor which transforms each vector into a scalar or vector value of a corresponding voxel of the at least one target medical image.

15. The image generation system according to claim 12, wherein the transform processor further includes at least one of:
a data mining processor programmed to search and identify and select corresponding input medical images and target medical images of a common region of each of a plurality of subjects; and
a machine-learning processor programmed to be trained to translate corresponding voxels of the input medical images into a corresponding voxel of one of the target medical images.

16. The image generation system according to claim 12, wherein the transform processor is programmed to apply the transform to the plurality of input medical images by:
a) identifying a corresponding voxel in each of the input medical images and the target medical image;
b) forming the identified voxels of the input medical images into a vector;
c) transforming the vector into a scalar value of the corresponding voxel of the target medical image; and
d) repeating steps a)-c) for a plurality of voxels.

17. An image generation system including means for:
receiving a plurality of input medical images of a region of interest, each input medical image with different characteristics indicative of a first imaging modality;
training a transform with the plurality of input medical images and retrieved corresponding target medical images;
applying the trained transform to the plurality of input medical images; and
generating at least one exact target medical image from the plurality of input medical images, the at least one exact target medical image having characteristics being different from the input medical image characteristics.

18. The image generation system according to claim 17, wherein the means is programmed to generate a family of medical image target images from a family of input medical images; and
wherein the family of medical image inputs and the family of medical image target images are from different image modalities that are selected from a group including MR, CT, ultrasound, X-ray, radiography, nuclear medicine, elastography, tactile imaging, photoacoustic imaging, thermography, echocardiography, and functional near-infrared spectroscopy.

19. The image generation system according to claim 17, further including a vector-to-scalar-mapping means.

20. The image generation system according to claim 17, further including at least one of:
a data mining means for identifying and selecting corresponding medical input image and target medical images of a region of interest; and
a machine-learning means for selecting corresponding voxels for a plurality of the medical input images and one of the target medical images and training a machine learning algorithm with the corresponding voxels.

* * * * *